Nov. 28, 1950     H. L. SMITH, JR     2,531,478
APPARATUS FOR STERILIZING

Filed Oct. 19, 1946     15 Sheets-Sheet 1

INVENTOR.
Horace L. Smith, Jr.
BY George A. Evans
ATTORNEY.

Nov. 28, 1950  H. L. SMITH, JR  2,531,478
APPARATUS FOR STERILIZING
Filed Oct. 19, 1946  15 Sheets-Sheet 2

INVENTOR.
Horace L. Smith, Jr.
BY
George A. Evans
ATTORNEY.

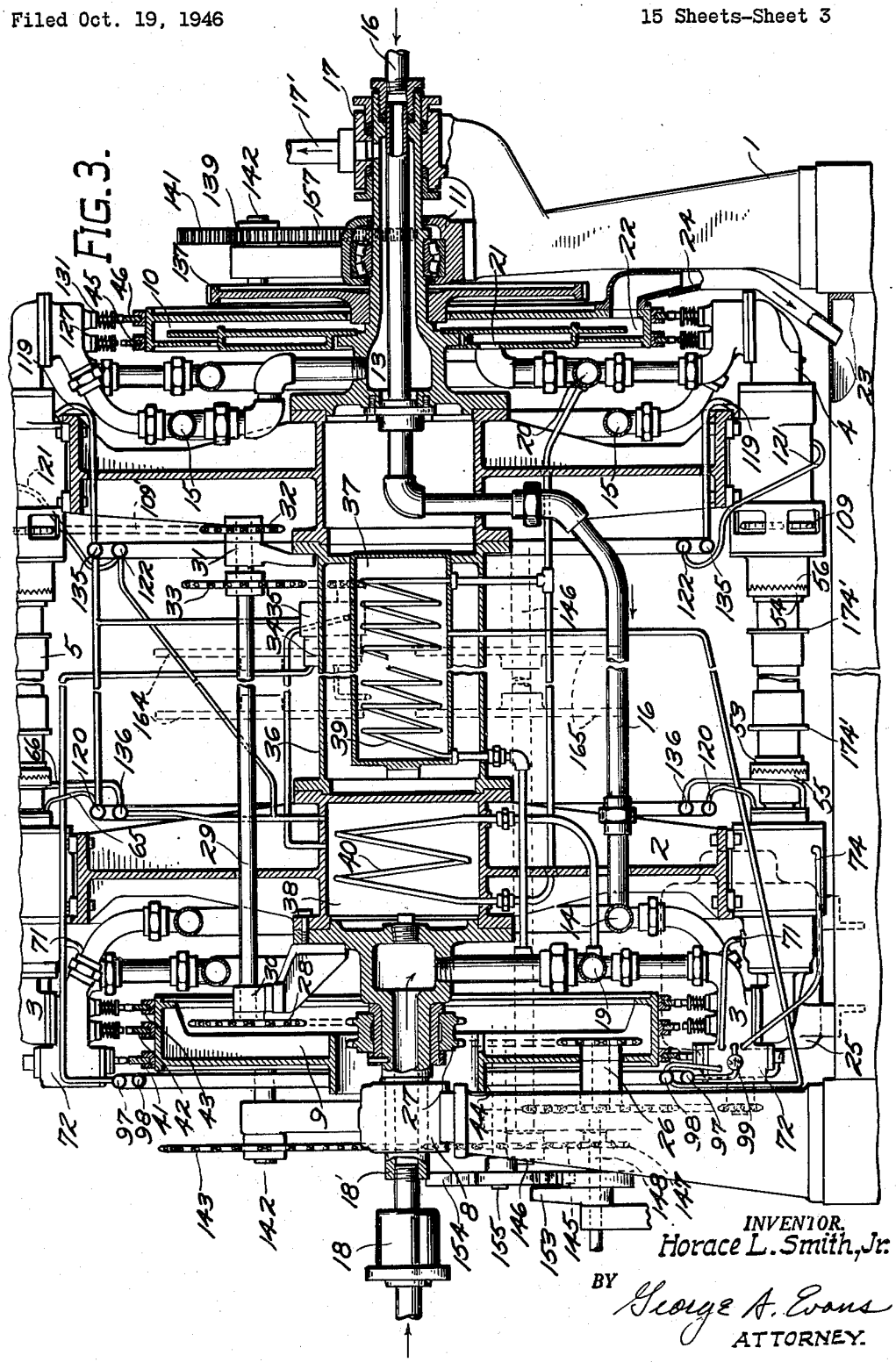

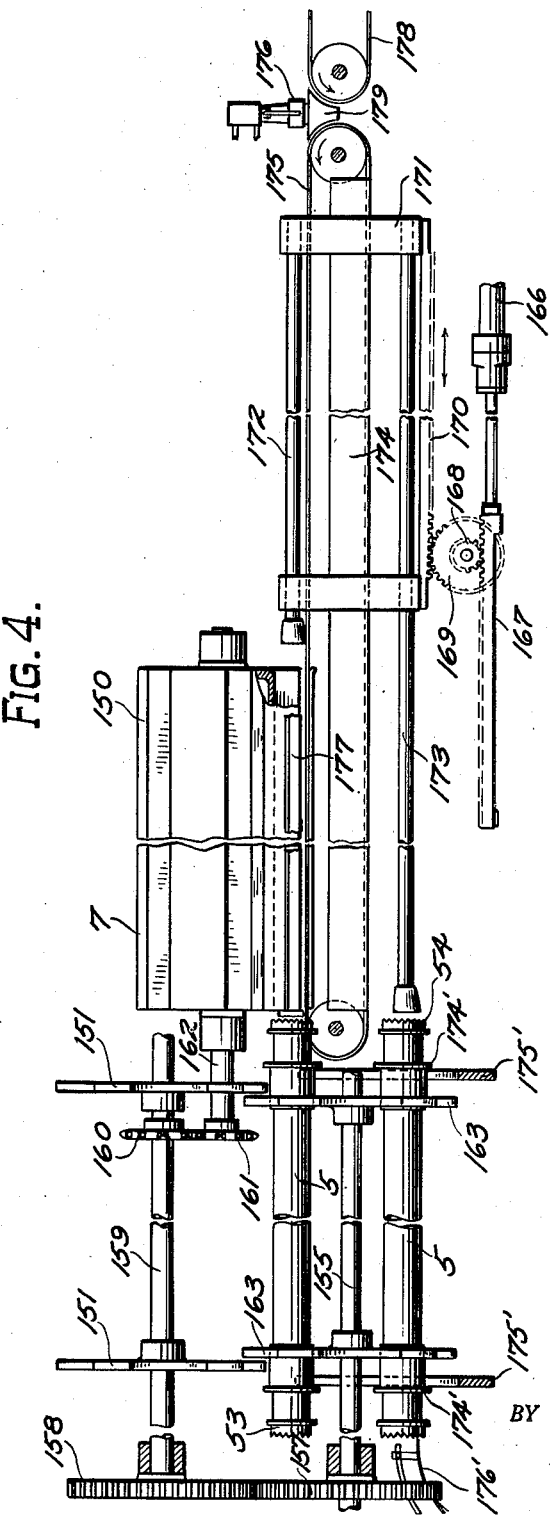

Nov. 28, 1950     H. L. SMITH, JR     2,531,478
APPARATUS FOR STERILIZING
Filed Oct. 19, 1946     15 Sheets-Sheet 5
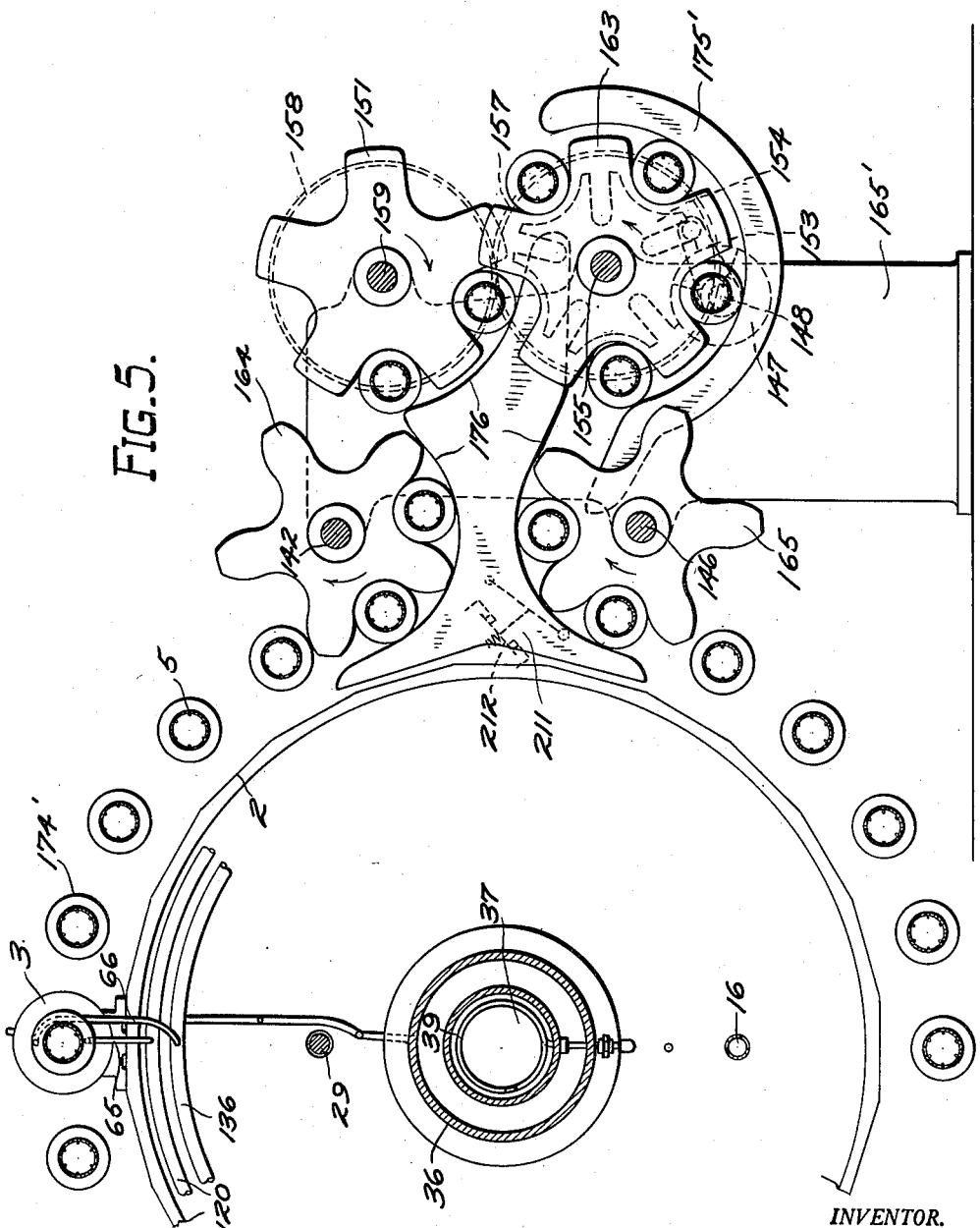
INVENTOR.
Horace L. Smith, Jr.
BY
George A. Evans
ATTORNEY.

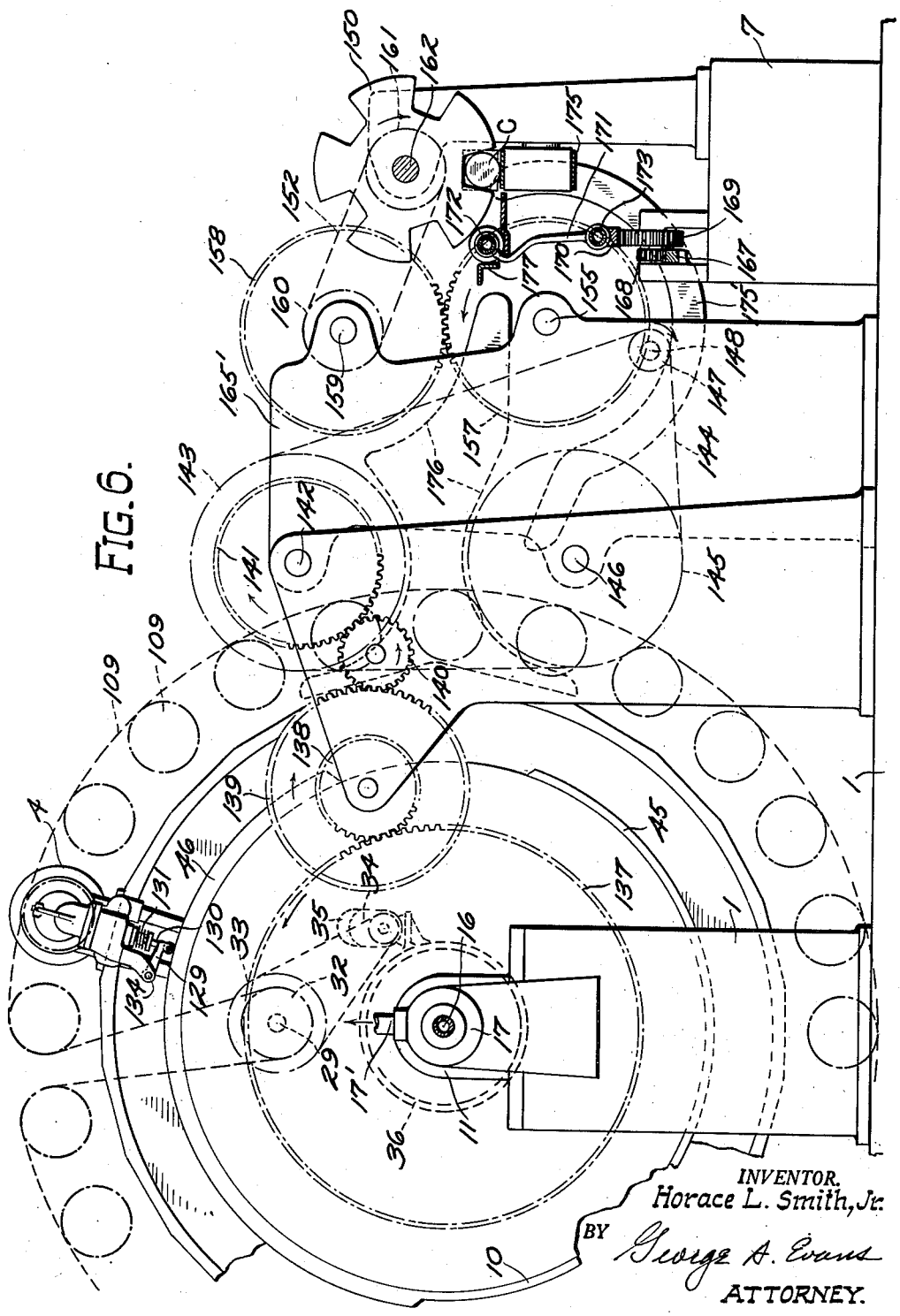

Nov. 28, 1950     H. L. SMITH, JR     2,531,478
APPARATUS FOR STERILIZING
Filed Oct. 19, 1946     15 Sheets-Sheet 7
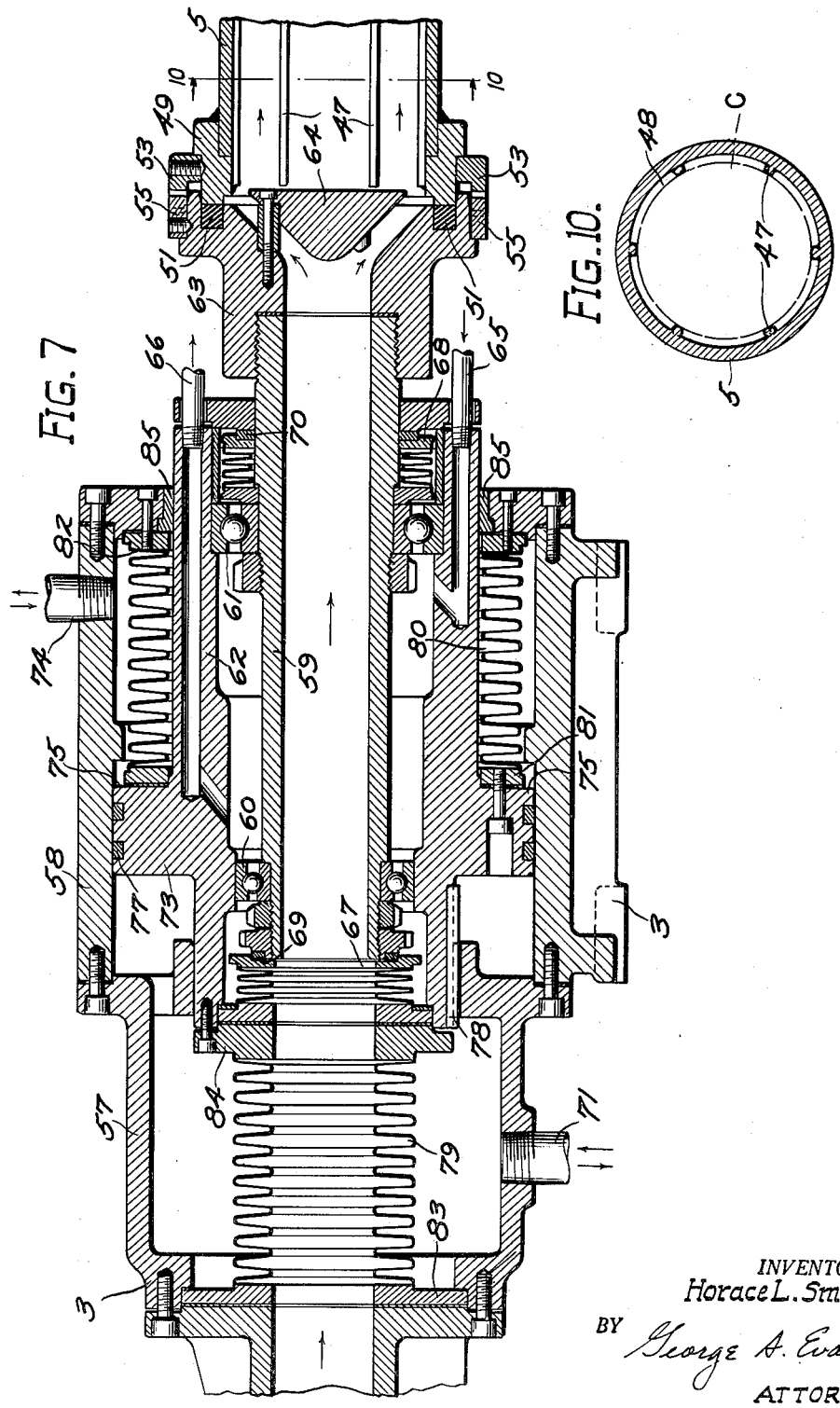
INVENTOR.
*Horace L. Smith, Jr.*
BY *George A. Evans*
ATTORNEY.

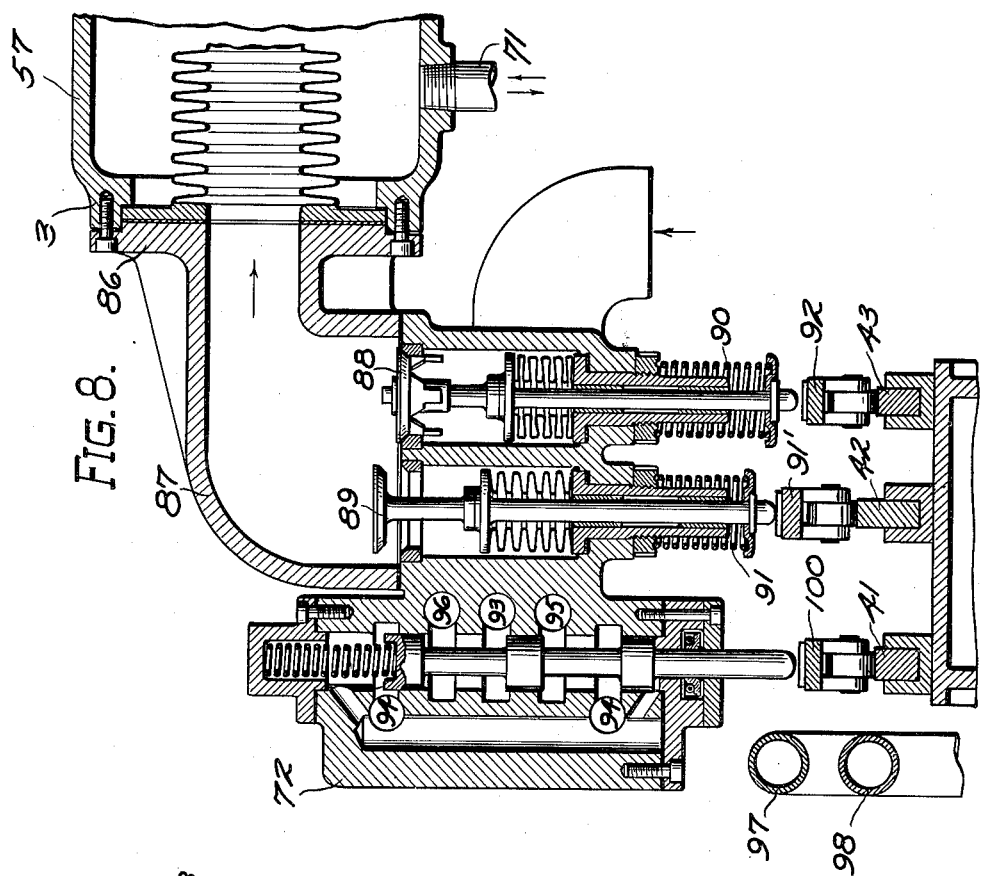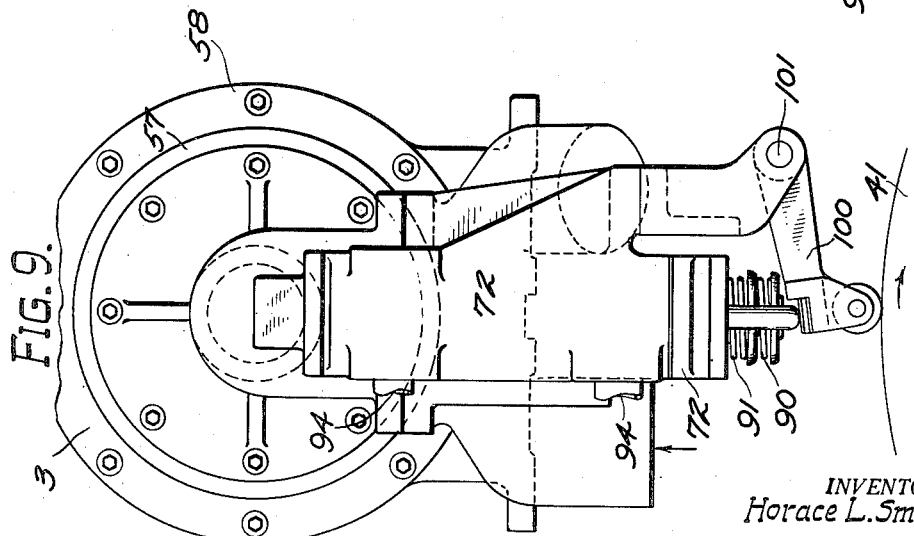

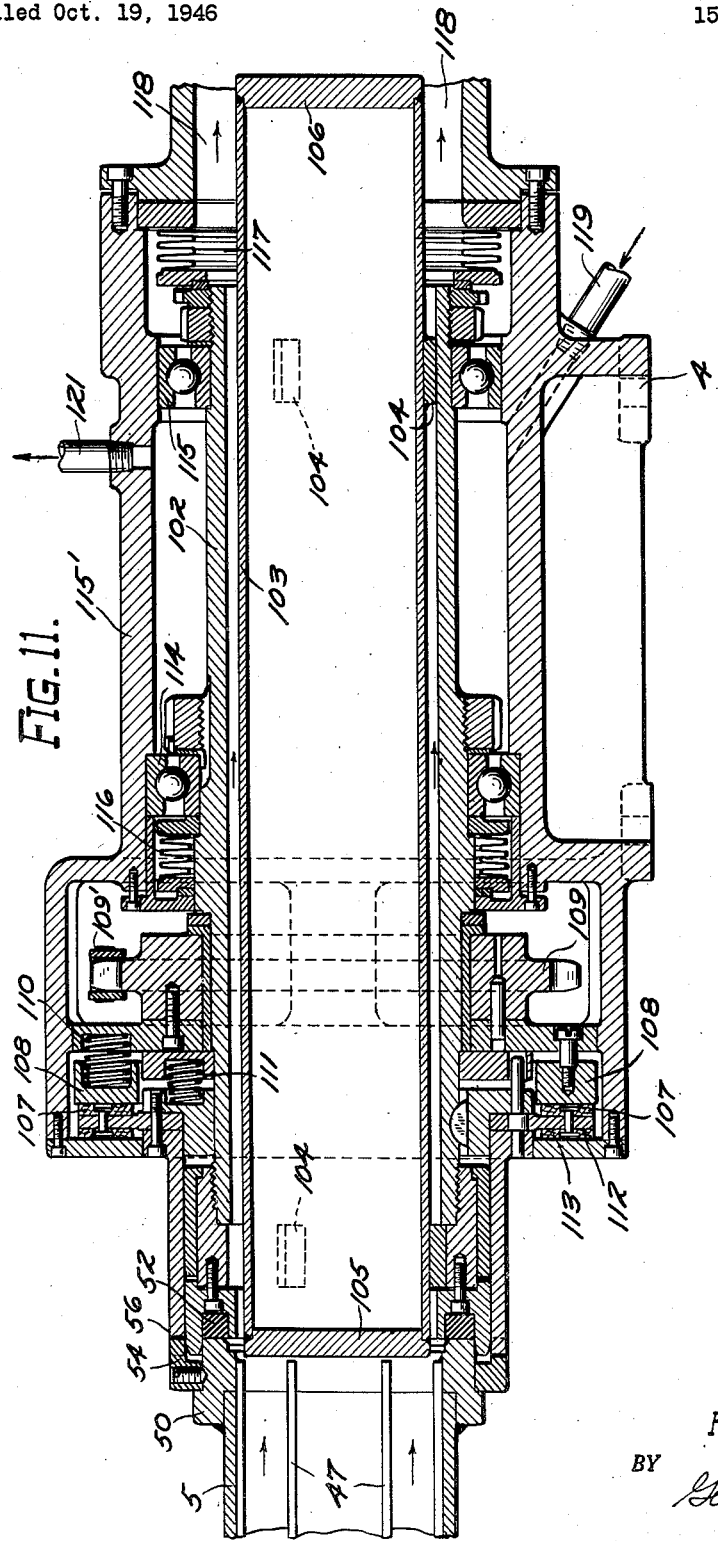

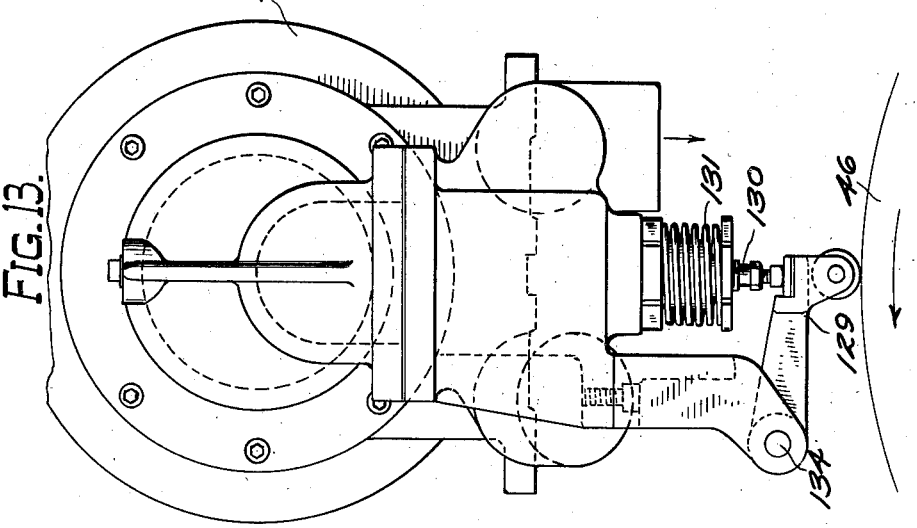
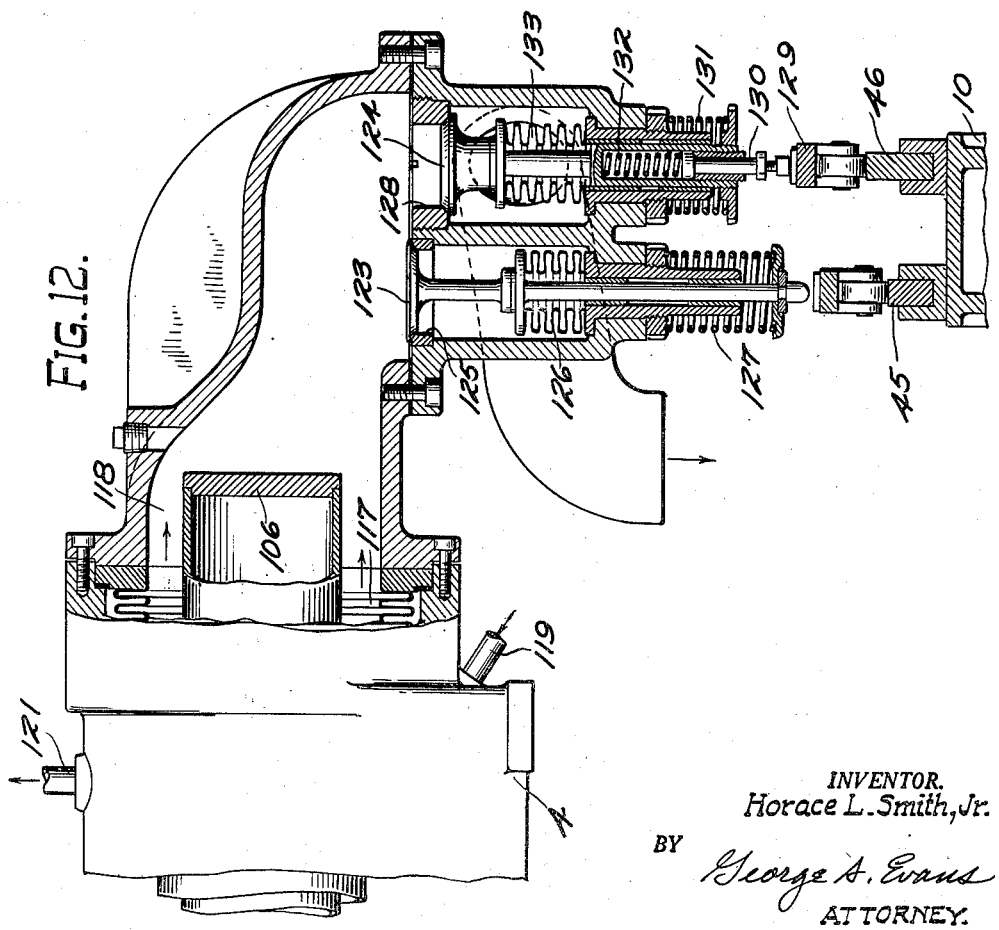

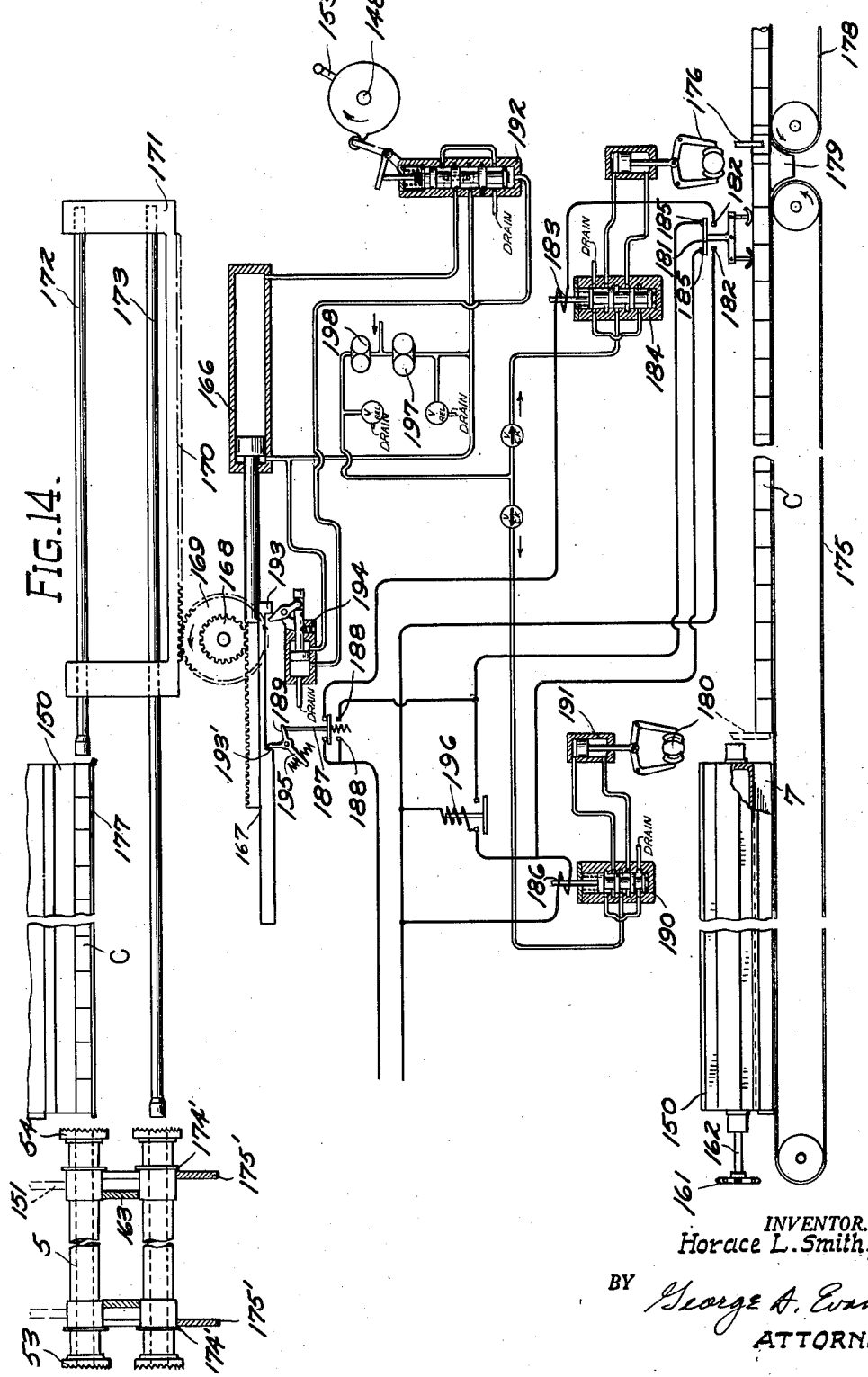

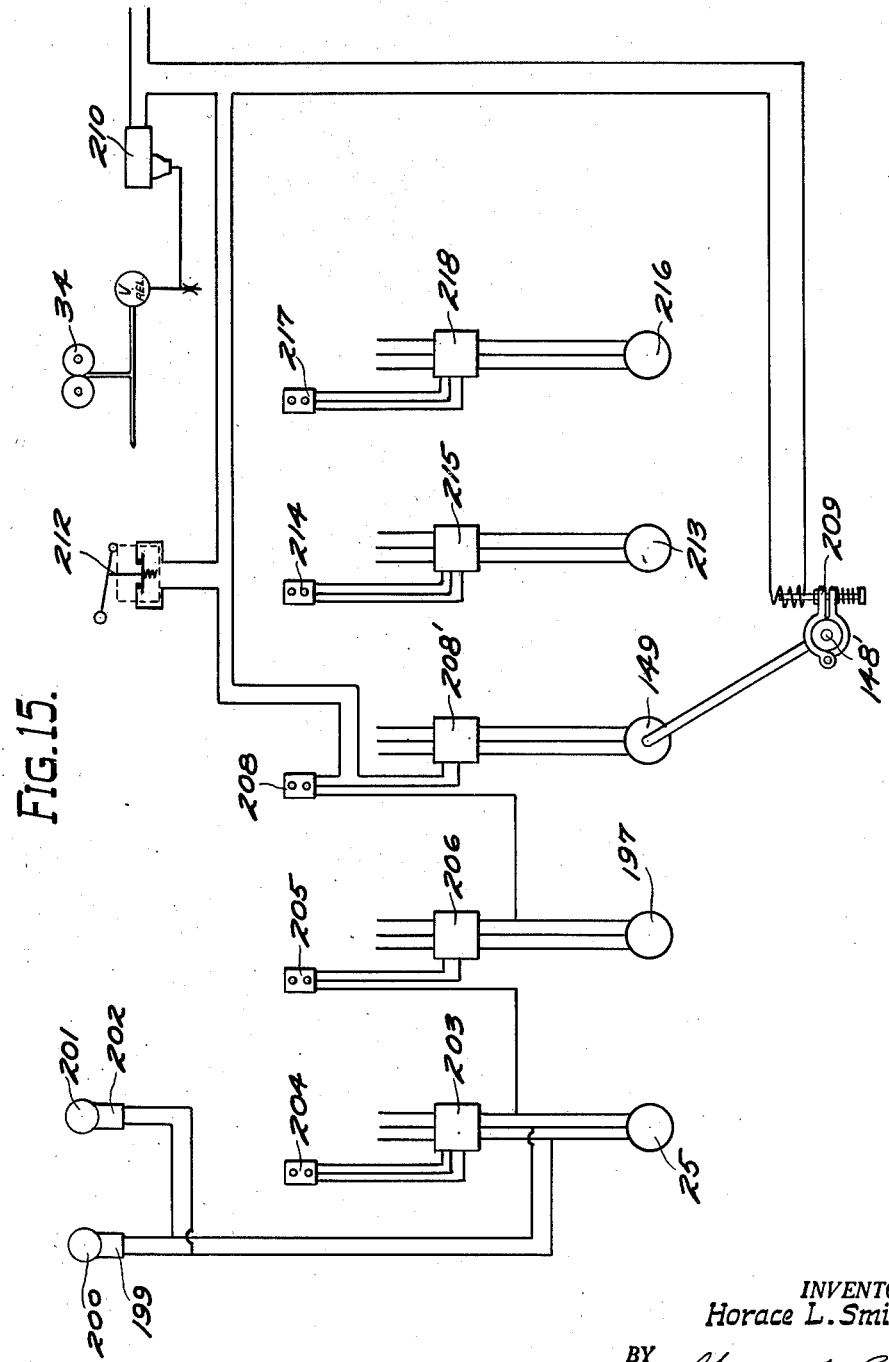

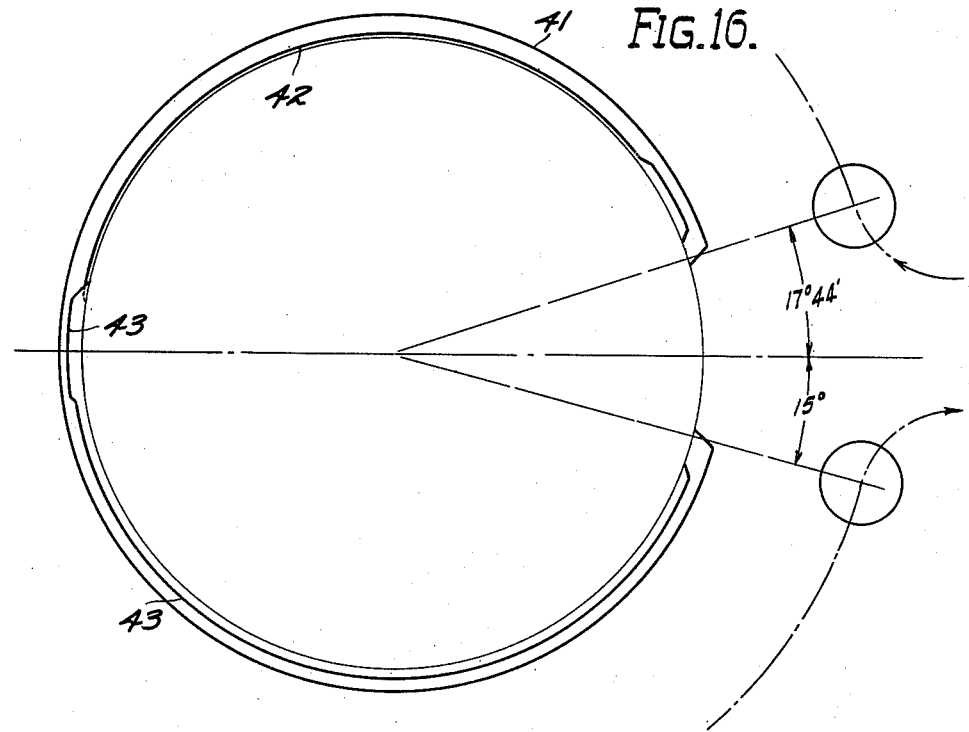
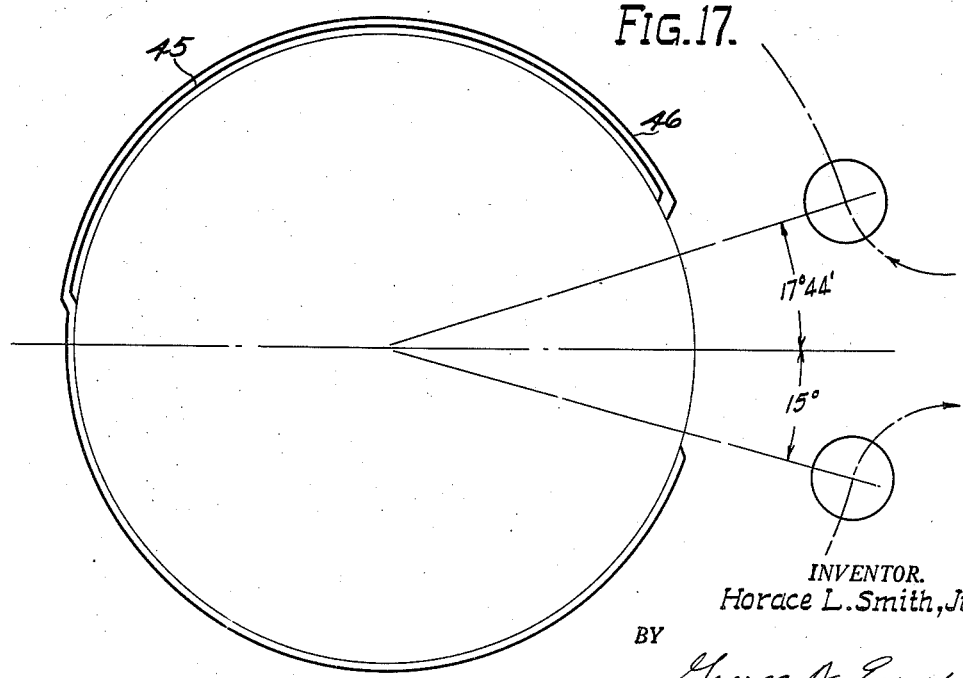

Nov. 28, 1950          H. L. SMITH, JR          2,531,478
APPARATUS FOR STERILIZING
Filed Oct. 19, 1946          15 Sheets-Sheet 14
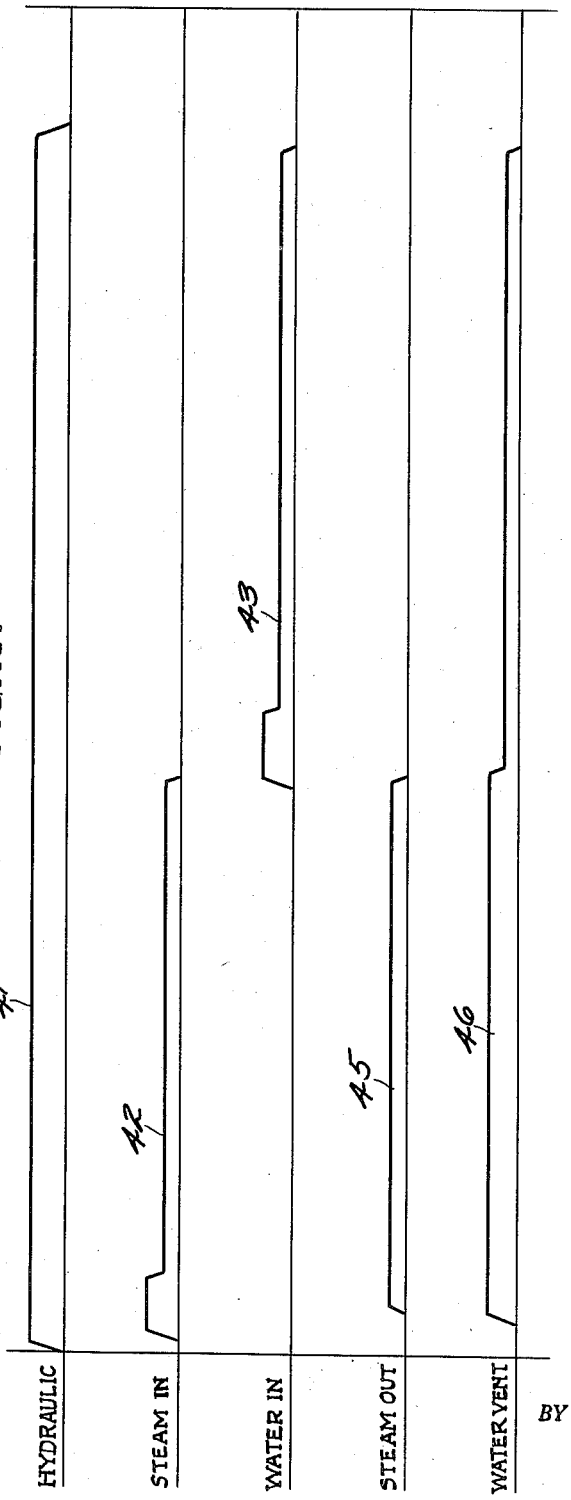
INVENTOR.
Horace L. Smith, Jr.
BY
George A. Evans
ATTORNEY.

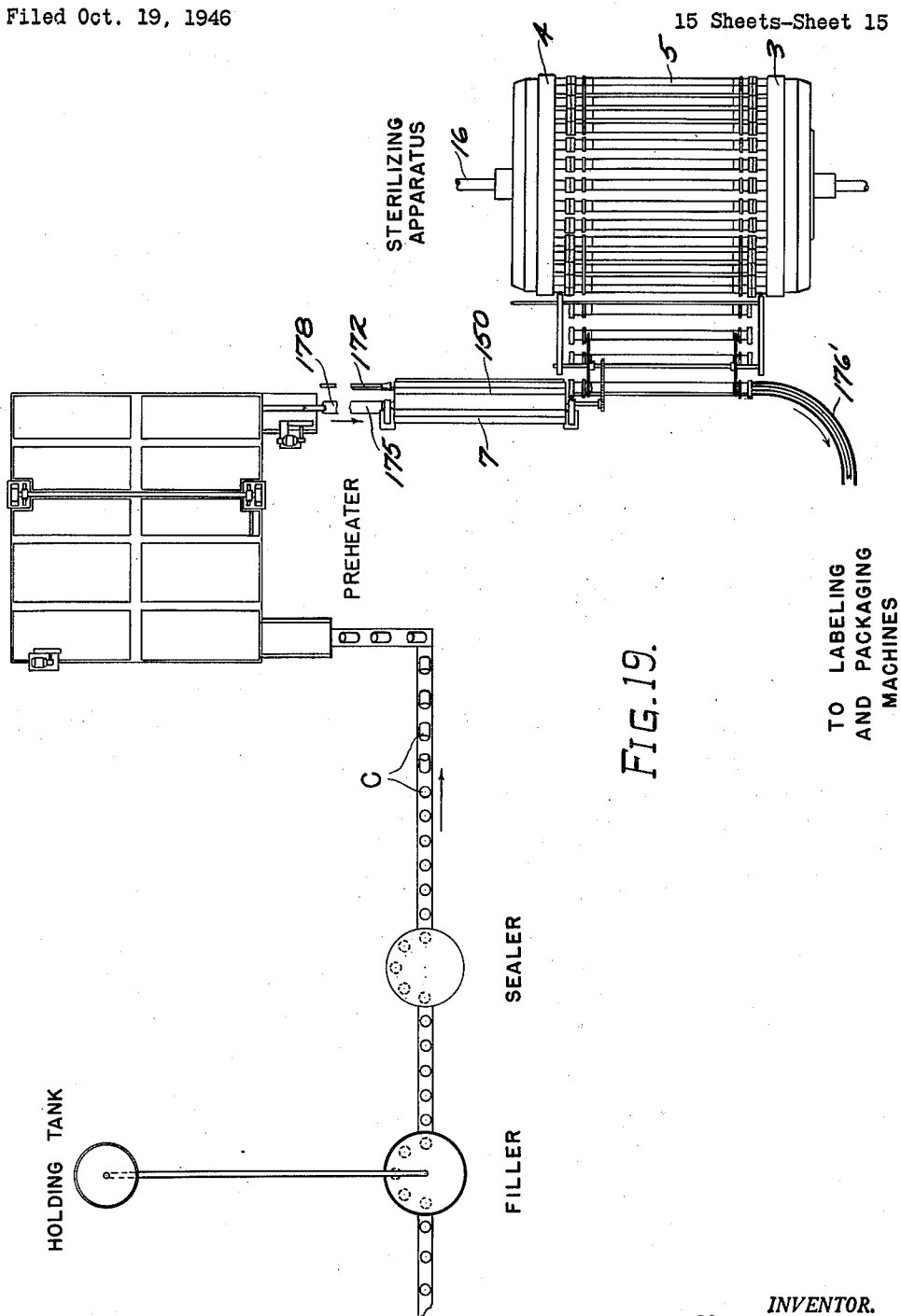

Patented Nov. 28, 1950

2,531,478

UNITED STATES PATENT OFFICE 2,531,478

APPARATUS FOR STERILIZING

Horace L. Smith, Jr., Richmond, Va., assignor to Chain Belt Company, Milwaukee, Wis., a corporation of Wisconsin Application October 19, 1946, Serial No. 704,481

13 Claims. (Cl. 99—361)

The art of sterilizing evaporated milk and other similar products has existed for a long period of time and methods have been used which effectively dispose of harmful bacteria; however, it remains to produce a sterile evaporated milk which has no taste defects, is alike to fresh milk in color and which has inherent qualities of viscosity enabling the storage of milk for periods upward of a year. Milk produced and sterilized by the conventional methods used today has a "cooked" taste, is generally off-color from fresh milk and very frequently completely coagulates in the can when it is stored for any length of time. Very often the conventional methods and processes used produce a condition whereby the inside of the can is coated with scorched milk; also the tinning on the inside of the can is sometimes removed which condition also imparts a metal taste to the milk. Many recent experiments have failed to properly overcome these defects and impediments in the resultant finished food product. This invention is generally concerned with the production and sterilization of evaporated milk and other comestibles, so that they may have the highest possible quality without having the defects mentioned.

The embodiment, which is illustrative of this invention, performs as follows: cans containing milk, or semi-liquid food products, which may or may not be preheated, are first placed in steel tubes. The tubes are next placed on a circular rotary support, whereupon during one revolution of the circular support the tubes are simultaneously rotated about their longitudinal axis; super atmospheric steam is admitted into the tube for a determined length of time, sterilizing the contents of the cans. Subsequently, water is admitted under pressure for a determined length of time whereupon the cans and their contents are cooled.

At the end of the revolution of said circular support the tube is taken off of the circular support. The cans are removed from the tube and placed on a conveyer for subsequent packaging or, further cooling and subsequent packaging. Thus, in a very short time the cans and their contents are sterilized and cooled with absolute control of the milk, or semi-liquid food contents in the can so as to produce the best possible milk or food product.

Whereas it would be possible to treat the canned milk, or food products, in an apparatus comprising one tube and still accomplish the desired results as far as the edible and physical properties of the milk, or food products, are concerned; it could not be done as practically, for the cost of such an undertaking might be prohibitive. This invention enables one to continuously subject a plurality of cans of milk, or food products, in a liquid or semi-liquid state to the same meticulously controlled method at a high rate of production. It will be noted also from the drawings that this improved machine is compact and wholly self-contained by reason of its novel features of construction and design well within the spirit of the invention. This further saves floor space for those utilizing it in the milk, or food industry.

It is the object of this invention to provide an improved apparatus in which a superior quality of sterile evaporated milk or other semi-liquid comestibles may be produced, such milk having all the natural flavors and qualities of whole natural milk when it is diluted with water to the correct proportions.

It is also the object of this invention to enable the "flash" sterilization of milk or other comestibles, i. e., heating the milk or comestible to the temperature required for sterilization in a very short time.

It is further another object of the invention to sterilize the milk or comestible without cooking or burning the milk.

Another object of the invention is to provide the best possible heat transfer from heating and cooling medium to the contents of the cans to avoid the cooking or scorching of the comestible.

It is another object of the invention to accomplish the aforesaid object in the minimum amount of time.

Still another object of the invention is to provide means for effecting accurate control of the temperature and time during which the cans of foodstuff are sterilized and cooled.

Another object of the invention is to provide an apparatus which will permit the safe sterilizing of cans without rupturing them.

A further object of the invention is to provide an improved apparatus which will have a high rate of production; and to provide an apparatus which is compact, economical to operate, and capable of easy manufacture.

In the detailed description of the invention reference will be made to the accompanying drawings which illustrate an embodiment thereof.

In the drawings:

Fig. 3 represents the rotatable circular support with parts thereof broken away and in section;

Fig. 4 shows disposition of the loading mechanism otherwise shown in part on Figs. 1 and 2;

Fig. 5 illustrates the position of the loading and unloading mechanism in regard to the rotatable circular support and is a sectional view taken along the lines 5—5 of Fig. 1;

Fig. 6 is a modified diagrammatic drawing showing the disposition of the driving instrumentality for the rotatable circular support and the tubes thereon;

Fig. 7 is an enlarged sectional view of the inlet heads taken along the lines 7—7 of Fig. 1;

Fig. 8 is another enlarged sectional view of the inlet valve assembly;

Fig. 9 is a side elevation of the structure shown in Fig. 8;

Fig. 10 is a cross sectional view of the tube taken along the lines 10—10 of Fig. 7;

Fig. 11 is a cross sectional view of the outlet heads taken along the lines 11—11 of Fig. 1;

Fig. 12 is a partly broken away sectional view of the outlet valve assembly;

Fig. 13 is a side elevation of the outlet valve assembly shown in Fig. 12;

Fig. 14 is a diagrammatic drawing showing the arrangement of the control means for the loading and unloading of the apparatus shown in the previous drawings;

Fig. 15 is a schematic drawing showing the electrical and safety connections for the apparatus;

Fig. 16 is a diagrammatic drawing showing the inlet cycle;

Fig. 17 is another diagrammatic drawing showing the outlet cycle;

Fig. 18 is a linear graph showing the relationship of all of the treating steps in the cycle;

Fig. 19 is a flow diagram showing the respective positions of a filler, a "Thermo-Roto," and the sterilizing apparatus.

Like numerals refer to like parts throughout the different views:

Figure 1:
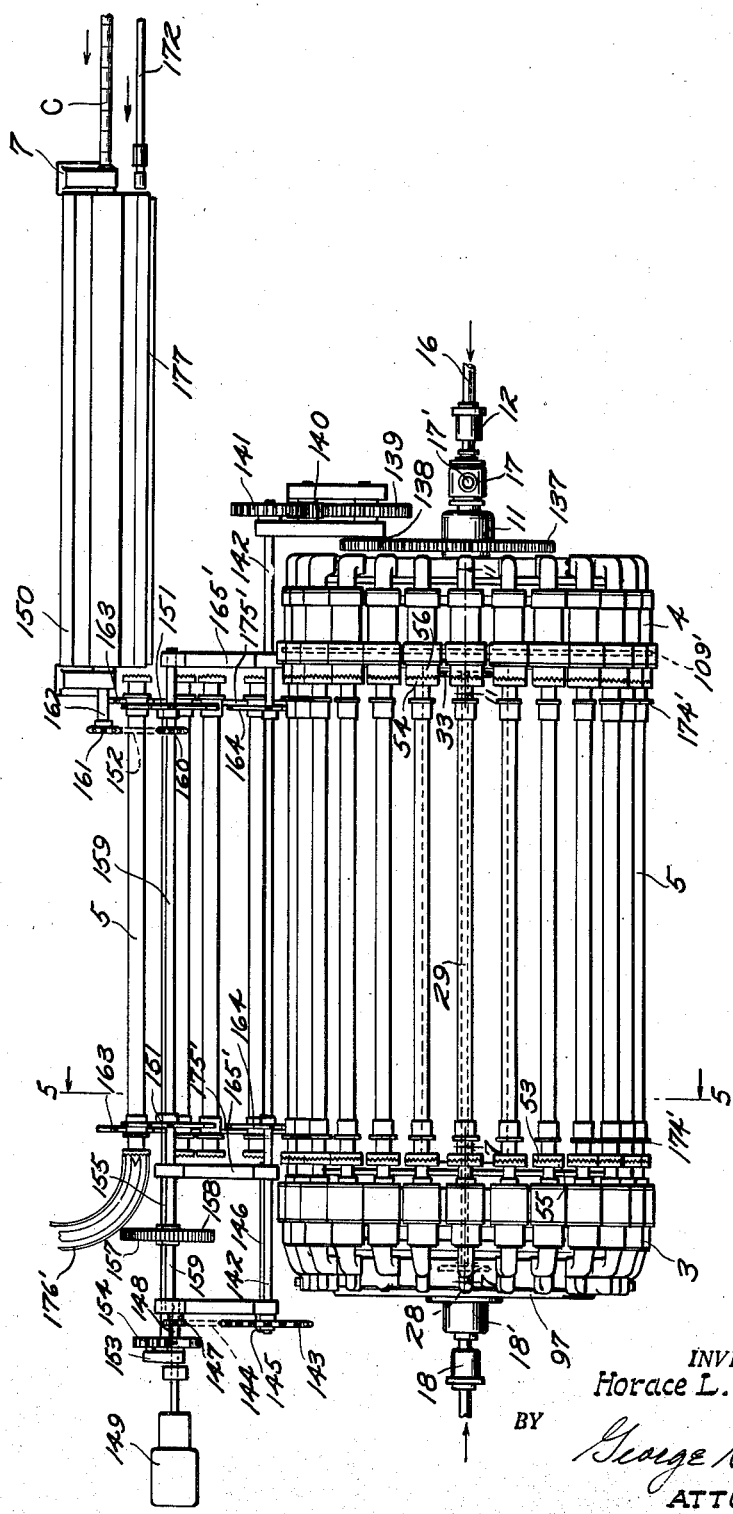
Fig. 1 is a plan view of the apparatus of this invention.
Figure 2:
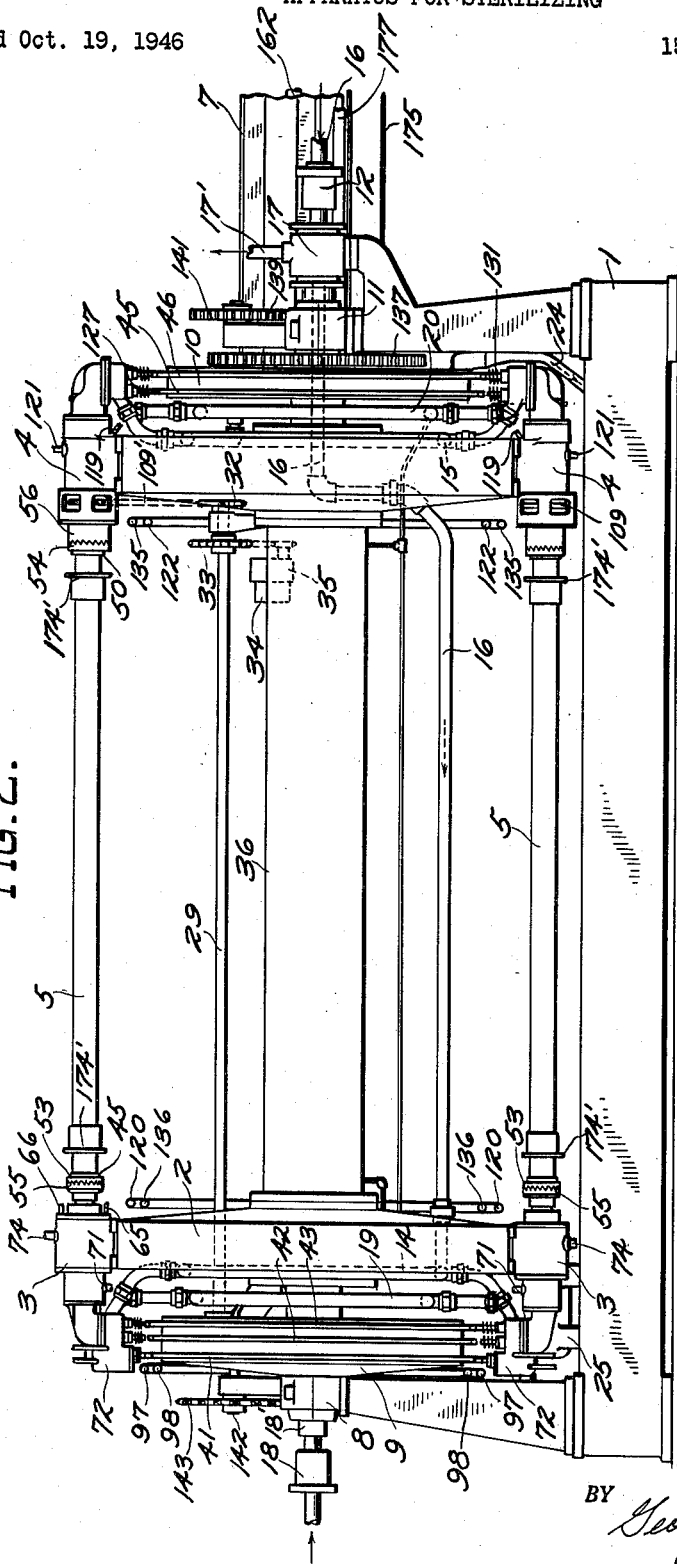
Fig. 2 is a front elevation of the apparatus shown in Fig. 1.

Referring to the drawings and more particularly to Figs. 1 and 2, the disclosed machine includes a frame 1 and a circular support 2 rotatably mounted thereon. Fixed to this circular support and located on its periphery are a plurality of radially spaced inlet heads 3, and a like number of exhaust heads 4 at the opposite end of the support. Each set of heads is disposed to carry a tube 5. The number of tubes is in excess of the number of sets of heads as the number in excess is held by a loading mechanism to be subsequently described. Mounted on the frame on the front side of the machine is the feeding mechanism 7. Also mounted on the frame are the cam supports 9 and 10 which operate the valves in the inlet and exhaust heads as the circular support is rotated about its longitudinal axis.

Referring to Figs. 2 and 3, it will be noted that the rotatable circular support 2 is journalled on bearings mounted to the frame at 8 and 11. On either end of the circular support are trunnions which are apertured, one to permit passage of water and the other steam. Attached to the trunnions at either end are rotary couplings which enable the steam and water to pass therethrough while the circular rack is rotated. The rotary coupling 12 permits the passage of steam into the hollow trunnion 13 whence it is tapped off and directed to the twenty-four inlet heads 3 by means of piping and a manifold 14. The exhaust steam is tapped off of the twenty-four outlet or exhaust heads 4 by piping and directed to a manifold 15, thence directed to the space between the hollow trunnion and the hollow shaft 16 carrying the inlet steam, whence it is removed by reason of a rotary exhaust coupling 17 which has outlet piping 17'.

The water is admitted to the machine by means of the rotary coupling 18, thence it passes through the trunnion 18' and is tapped off and directed to each of the twenty-four inlet heads by means of piping and a manifold 19. The exhaust cooling water is taken off of the twenty-four exhaust heads by piping and a manifold 20 and directed to a rotating chamber 21 mounted on the support whence it is removed to the well 22 and next directed to a water tank 23 by the spout 24. It will be noted that the basin has walls to prevent any splashing or leakage as the support is rotated.

The tubes 5 are rotated about their own longitudinal axis from the instant they are taken on the rotatable circular support until they are taken off of it. This is accomplished by means of an electric motor 25 which is mounted to the frame 1. An intermediate sprocket shaft 26 is mounted on the frame by brackets and a bearing. This shaft has two sprockets mounted on it, one to receive and engage a chain drive from the motor, and the other to engage a chain drive to a sleeve 27 which is journalled on the trunnion at the water entrance side of the rotatable circular support. This sleeve 27 has two sprocket wheels mounted on it; one to engage a chain from the intermediate sprocket shaft 26 and another to engage a chain to the sprocket 28 which is mounted on the shaft 29. The sleeve rides on the trunnion with sufficient clearance so as not to interfere with the rotation thereof. The sprocket 28 is fixed to the shaft 29 which is journalled in bearings mounted by brackets 30 and 31 within the circular support. Also mounted on the shaft 29 is the sprocket 32 from which an endless chain 109' passes over sprockets carried by each of the exhaust heads and back to the said driving sprocket 32. Thus the tubes are rotated by chains and sprockets; or, they receive the impetus for rotation from a power source which is located outside of the rotatable circular support. Mounted also on the shaft 29 is the sprocket 33 which engages a chain connected to a sprocket affixed to the hydraulic oil pump 34 and the lubricating pump 35 which are connected to a single shaft and mounted inside the rotatable circular support by means of brackets attached to the axial supporting member of the tube 36 as is apparent by reference to Fig. 2 and Fig. 3.

Mounted in the rotatable circular support, and axially connecting both of the ends is the hollow tubular support 36 in which are disposed the hydraulic and lubricating oil tanks 37 and 38. The hydraulic oil is heated somewhat as it passes through the plurality of inlet heads, and it is necessary to cool it. This is accomplished in the oil tank by means of a cooling coil 39 immersed in the oil. Water is passed through the coil by means of piping connected to the water inlet manifold 19 and the outlet manifold 20. The lubricating oil is also heated somewhat by passing through the plurality of forty-eight heads and it is cooled in its tank 38 by means of coils 40 whose inlet is connected by piping to the water inlet manifold 19 and whose outlet is connected by piping to the outlet manifold 20.

Mounted on the frame 1 are supports 9 and 10 on which the cams for actuating the valve stems of the valves contained in the inlet and exhaust heads are affixed. The hydraulic cam 41, the steam inlet cam 42, and the water inlet cam 43 are mounted on the same support 9 which does not revolve with the rotatable circular support but is fixed to the frame 1 by means of the support 44. The steam exhaust cam 45 and water exhaust cam 46 are mounted on a separate support 10 which is also the sustaining frame of the catch receptacle 21 for the exhaust water. It too does not rotate, but is fixed to the frame. All of the five above mentioned cams are segments set in grooves having curved surfaces and are deployed somewhat at intervals over the periphery of their supports to conform to the desired cycle. Hence, as the rotatable circular rack makes one revolution all of the valves are actuated by the said cams.

Referring to Figs. 7 and 10, it will be noted that the tube assembly consists of four parts. First the tube itself 5, which in the instant case is long enough to contain twenty-four cans 3⅛ inches long placed endwise; a number of round steel rods 47 are placed apart and fixed to the internal bore of the tube, so that they will not distort when heated, thereby providing a minimum of clearance between the cans C and the rods and therefore a tractive surface so that the cans will revolve with the tube 5 when it is rotated. The cans used in the instant case are 2⅛ inches outside diameter. Another purpose of the laterally extending rods is to provide an open space between the cans C and the tube itself; i. e., arcuate passages 48, as shown in Fig. 10. These permit the steam and water to freely pass around the cans and also facilitates easy expulsion of any remaining water when steam is passed therethrough. Since the cross sectional area of the steam passage is reduced by insertion of cans C in the tube, leaving only the space between the internal bore of the tube and the peripheries of the cans, the velocity of the steam is increased as it passes through this reduced area. The end rings 49 and 50 are affixed to each end of the tube; the outer faces or extremities of these rings are machined square and are chamfered to permit their easy insertion and firm seating against the soft packing 51 and 52 set in the heads at each end of the tube. Mounted on the rings 49 and 50 are the serrated face rings 53 and 54, these are pressed on the tube and locked against any possible movement by setscrews. They act as a multiplicity of dogs, or as a claw coupling, engaging like serrated face rings 55 and 56 attached to the head spindles when the spindle of the inlet head is moved forward by hydraulic force. Thus the soft packing prevents any leakage and the serrated face rings effectively transmit the motion of the spindles 102 and 59.

The intake valve head comprises an assembly which admits steam and water, controls the hydraulic system and has contained therein the hydraulic apparatus which effects the clamping of the tube. This is shown in Figs. 7, 8 and 9.

The spindle head consists of a housing in two sections 57 and 58 and a piston assembly. The spindle 59 is tubular to permit steam and water to pass therethrough and is mounted in the rearward section on ball bearings 60 and 61, which in turn are mounted in the piston assembly 62. Attached to the end of the spindle at the tube end is a head 63, which as previously described has attached to it a serrated face ring 55. Also there is a recessed groove which in turn contains the packing 51. The mouth of the head 63 is hollow and flared also; inserted in it is a conical plug 64 which is separated from the walls of said mouth by spacers and secured by bolts. This feature permits the steam to be directed around and over the cans in the tube through the arcuate channels 48 provided by the rods 47.

The bearings are force feed lubricated having an inlet at 65 into a reservoir being disposed within the body of the piston assembly and an outlet at 66 so that cool air may enter at the bottom and warm oil leave at the top. The oil is sealed in the reservoir and bearings by rotary seals 67 and 68 which are of the bellows type and are so constructed to withstand high temperatures which the steam occasions. The ends of the bellows are provided with shoes which transmit pressure on the rings 69 and 70 mounted on the housing.

The piston assembly 62 is disposed to provide axial movement for the spindle. The oil which energizes this piston is admitted at 71 under pressure by means of piping from the valve 72 attached to the head assembly. It acts on the face of the piston 73 forcing the piston toward the tube 5. Due to the difference of pressure when the pressure is released at 74 the oil, which is intermittently admitted at 74, from the valve port 96 acts on the opposite face of the piston 75, the oil being sealed by the piston rings 77, and forces the piston back. This is brought about by reason of the action of the valve 72 which shifts to stop the flow of oil to the larger piston face and also permits the oil which is displaced by the piston to flow into the cooling reservoir 37. A key 78, which is fixed to the piston, engages a slot in the housing to prevent any rotation therewith. The oil is sealed on both sides of the piston by bellows seals 79 and 80; which are fastened to the end plates 81 and 82 at the forward end of the head, and plates 83 and 84 at the rearward end of the head. These plates engage the bore of the housing in a tight fit and are bolted to it, thus effectively sealing the oil. The bellows seals 79 have a lateral movement which is equivalent to the total axial movement of the piston. The piston is also provided with a bearing 85 which is part of the end plate assembly and which is of the sleeve bushing variety.

Referring to Figs. 8 and 9 it will be noted that attached to the intake head 3 is the valve assembly 86 which further consists of a housing 87, a steam valve 88, a water valve 89, and the hydraulic valve 72. It will be noted that the steam and water will pass into a common passage which is directly connected in a straight line to the rotating tube. The steam valve 88 is the usual variety of poppet valve. There are guides below the top of the valve and a saw tooth apron to permit throttling of the valve; the valve stem is sealed by means of a bellows packing. The valve is also kept in a closed position by the action of a coil spring 90. The water valve 89 is of the usual variety of stem valves having a bronze seat, and it is also sealed by means of a bellows packing. It is further retained at a closed position by means of the coil spring 91. Both of these valves are actuated by the cams 42 and 43; roller followers 91' and 92 force the valve stems upward and will be further described later.

The hydraulic valve 72 is mounted on the housing 87 next to the steam and water valves. This is a piston type valve having four ports; an inlet port 93, the oil pump also is connected to it by means of piping to the hydraulic inlet manifold 97, two outlet ports 94 which are connected to the hydraulic outlet manifold 98, a port 95 to the large piston, and a port 96 to the smaller piston. When the valve is opened the oil under pressure from the pump flows through the check valve 99, shown in Fig. 3, then through the port 95, then to inlet 71 and to the piston chamber; when closed the oil flows through the ports 94 to the outlet manifold 98 and thence by means of piping to the reservoir 37. Oil is intermittently admitted to the reverse side 75 of the piston being synchronized with the flow stoppages to the large piston. The aforesaid oil flows through port 96 being connected by means of piping to the port 74. This action forces the piston assembly backward and holds the heads 3 in open position. The valve 72 is further actuated by action of the roller follower 100 on the cam 41. The three roller followers aforesaid are mounted on a common shaft 101 supported by brackets mounted on the housing. As shown in Fig. 8 the valve 72 is in a position to open the heads 3, as oil passes from port 93 to port 96, and on to port 74 and the small piston. The exhausting oil from the larger piston flows through port 95 and through port 94, thence to the outlet manifold 98. As the stem of valve 72 is raised ports 93 and 95 are in communication; this permits oil to flow against the large piston 73, meanwhile ports 93 and 96 have been closed to each other and the exhausting oil from the small piston 75 flows through ports 96 and 94, thence to the outlet manifold 98. It will be noted that a small check valve 99 is interposed between the inlet manifold 97 and the valve port 93 so as to prevent any back flow as the plurality of inlet heads are operated under divers steps of the cycle to be described.

The exhaust head 4 contains valves to permit steam and water to escape, a clutch and driving means to rotate the tube, a spindle, bearings for the driving spindle, a housing and a claw coupling and seal to engage and seal the tube. This is understood by reference to Figs. 11, 12 and 13.

The spindle 102 has a hollow tube 103 concentrically placed in its bore and supported and attached to lugs 104 which are spaced some 90° apart in the bore of the spindle. The hollow tube is stopped at both ends by metal plugs 105 and 106. This permits the steam and water coming from the rotated tube to follow a straight line around the tube and the bore of the spindle through the arcuate passages 48 into the exhaust chamber, hence guarding against any accumulation of water, besides giving free passage to the steam and water, and by continuing the reduction of the cross sectional area of the steam passage further maintaining the velocity of the steam until it is exhausted and is out of contact of the cans.

The end ring 50 of the rotary tube 5 seats and seals itself on the packing 52 which is placed in a groove of the spindle, when the piston in the inlet head is moved forward by hydraulic pressure controlled by the valve 72. The serrated face ring 54 engages the spindle serrated face ring 56 which slides back, a friction disc 107 thereupon engages the face of the clutch plate 108 and this causes the tube to rotate about its longitudinal axis by means of a friction drive. The clutch plate 108 is driven by a sprocket 109 and chain 109'. The sprocket is journalled on the spindle 102 having a sleeve type bearing of anti-friction metal, so that when the clutch is disengaged the sprocket may freely ride on the spindle 102.

The friction disc 107 may be disengaged from the clutch plate by reason of the action of the hydraulic piston 75 in the inlet head when the oil acting upon it forces the piston back releasing the tube. The clutch is further disengaged by the springs 110 which may push the friction disc away from the clutch plate and forces another friction disc 112 against the plate 113. This can stop the rotation of the tube 5. The spindle in the exhaust head is supported by ball bearings 114 and 115 which are force feed lubricated. The oil entering at the port 119 is connected by means of piping to the lubricating inlet manifold 135 and leaves through port 121, thence directed to the lubricating outlet manifold 122 which is in turn connected to the reservoir 38. The housing 115' contains the bearing races. The oil is sealed by rotary seals of the bellows type 116 and 117 which have been previously described.

The hollow tube 103 projects into the exhaust chamber whereupon the steam is exhausted. The exhaust chamber 118 contains two exhaust valves, one for steam 123 and one for water 124 as seen in Figs. 12 and 13. The steam exhaust valve is of the usual stem variety with a seat 125. It is sealed by a bellows packing 126 and has a coil spring 127 to keep it in a closed position. It is operated by action of the cam 45 on a roller follower, which is interposed between the cam and the valve stem.

The water exhaust valve 124 has a seat 128 and seats itself against pressure in chamber 118 on the top portion of the valve; this being the reverse seating arrangement of the steam valve. This design has been chosen so that the valve might perform three functions.

The first of these function being to be in a full open position; to accomplish this the roller follower 129 must fall free from the stem and plunger 130 whereupon the coil spring 131 pulls the entire assembly down. This position of the valve is needed at the start of the steam cycle of the machine when a blast of steam ejects all of the accumulated water in the tube and also evacuates all air from the tube and any other foreign contents therein. The second function of the water valve is to maintain a closed position when steam under pressure is passed through the tube. To effect this the coil spring 132 is compressed by the plunger 130, the spring acting on the valve stem thus keeps the valve closed at a pressure higher than the steam pressure on top of the valves. The initial flow of the cooling medium is also maintained at a pressure so as to prevent the busting of the cans by the closure of the valve up to a point of resistance to about 30 p. s. i. When the plunger is permitted to fall ¼ inch by reason of the contour of the cam over which the roller follower passes the valve remains closed up to a pressure of about 15 p. s. i. This is necessary when cooling water is passed through the tube and over the cans therein, for the water is admitted under pressure, so that the cans will not burst, but when the cans and their contents are sufficiently cooled the pressure must be relieved; this step is accomplished when the stem falls the said ¼ inch. In this manner the cans are prevented from being crushed by excessive pressure of the coolant. The valve is sealed with a bellows packing 133. The followers 129 and the matching one for the steam valve are mounted on a common shaft 134 which is supported by brackets fastened to the housing. Further, water and air exhausts through the port of valve 124; the steam exhausts through the port of valve 123.

The hydraulic system and lubricating system are wholly self-contained within the rotatable circular support with the exception of the initial driving means, an electric motor 25 which is mounted on the frame 1 as previously described. Reference being made to Figs. 1, 2 and 3 it will be seen that cool hydraulic oil is pumped from the tank 37 which is in the intermediate portion of the axle connecting the ends of the rotary support, by the pump 34. Thus by piping and a manifold 97 the oil may be directed to the inlet heads 3 through the hydraulic valve 72; which direct it to the piston face 73 as the position of the tube as it passes through the cycle demands. When the oil forces the piston 75 back the oil formerly used to energize the piston face 73 is directed back to the exhaust manifold 98, thence to the tank. This is accomplished as aforesaid and, of course, is caused by action of valve 72. Cool lubricating oil is pumped from the tank 38 arranged adjacent tank 37 within the circular support, by means of the lubricating oil pump 35 to all of the heads in the machine. This is done continuously while the machine is in operation, and is accomplished by the arrangement of piping from the pump 35 to the inlet manifolds 120 and 135 which in turn are connected to the respective ports 65 for the clamping heads 3 and 119 and for the driving heads 4. The outlets for lubricating oil 66 and 121 are connected to the outlet manifolds 136 and 122 respectively, which in turn are connected by means of piping to the oil tank 38. The hydraulic oil is always under pressure while the machine is operating, but is controlled at divers steps of the cycle by the action of the valve 72 as previously described.

The rotatable circular support rotates by reason of force applied to a system of gearing and chains. The large gear 137 is mounted to the rotatable circular support on the same side as the steam and exhaust valves. Refer to Figs. 1, 2, 3 and 6. By this reference it will be noted that the gear 137 meshes with a smaller gear 138 which is mounted to a jack shaft on which a larger gear 139 is also mounted. The gear 139 meshes with a small gear 140 which is used to change rotation as shown in Fig. 6. The rotation changing gear 140 which meshes with the gear 141 and which is mounted on a shaft 142 and which shaft extends to the hydraulic side of the machine, i. e. that side on which the heads 3 are operated by hydraulic pressure and are located as shown at the left in Fig. 1. On this side of the machine a sprocket 143 is mounted on the shaft 142. A chain 144 continuously passes over the sprocket 143, around the sprocket 145 which is mounted on the shaft 146, and around the small sprocket 147 which is mounted on the shaft 148, and which in turn is connected to a gear reducer and electric motor 149; this is the prime power source for the rotation of the machine.

As seen in Figs. 1, 4, 5 and 6 the chain drive 152 which drives the loading reel 150 and is associated with the loading star transfer wheel 151, is mounted on the exhaust side of the machine. The lever 153 on shaft 148 engages the slots of the Geneva wheel 154, said wheel being mounted on the shaft 155 on the hydraulic side, ahead of the small sprocket 147 on the other end of the shaft, i. e., nearest the adjacent tubes 5 shown in Figs. 1, 4 and 6, a gear 157 meshes with another gear of the same size 158, which is mounted on the shaft 159. On the shaft 159 is also mounted a small sprocket 160 over which the chain 152 passes and also passes over another small sprocket of the same size 161 which is mounted on the loading reel shaft 162.

Thus, the loading reel 150, the loading star wheel 151 and the unloading star wheel 163 have the same movement and this movement is further equal and simultaneous. However, the loading wheel 164 and unloading wheel 165 have continuous rotary motion by reason of the chain 144 and matching sprocket linkage to the drive shaft 148, as seen in Figs. 1, 4 and 6.

The shafts of the loading reels are supported by a structure mounted to the frame 1 as shown in Fig. 6. It will be noted that a hollow steel structure 165' supports the brackets which in turn support the shafts 142 and 146. The hollow steel structure is supported by structural members which are arranged so as to direct the bearing load onto the frame 1.

The means by which the machine is loaded and unloaded with cans can be readily understood by reference to Figs. 1, 4, 5, 6 and 14. Referring particularly to Figs. 4 and 14 it will be noted that a small hydraulic piston 166 is attached to the plunger, a rack 167 is arranged to mesh with a small gear 168, said gear being mounted on the same shaft with a larger gear 169, which in turn meshes with a rack 170 that is mounted to the plunger support 171. Two plungers, the filling plunger on the top 172, and the expelling plunger 173 on the bottom are mounted on the support. The support rides on a rectangular bar 174 which is mounted to the frame 1 by means of a bracket. A conveyer belt 175 is connected to a source of can supply and as twenty-four cans pass along this belt the next succeeding can is stopped by the holding mechanism 176 which clamps the can thereby stopping the succeeding cans. Whereupon the twenty-four cans are delivered into the loading reel 150, whereupon by action transmitted by the Geneva drive the reel rolls the cans back into the support 177. Whereupon the plunger rack 170 is moved forward. The plunger 172 pushes the cans into the tube 5 and the plunger 173 expells the cans from another similar tube at the unloading station. The tubes 5 are held against axial movement by means of the collars 174' which cooperate with the curved guides 175'. The loaded tube is then moved backward by the star loading wheel 151 over the guide 176. Whereupon it is engaged by the star loading wheel 164 which moves the tube along as it is guided by the support 176 into position on the rotatable circular support 2. At this station the tube is grasped and sealed by action of the heads, as previously described.

The tube and the contents therein receive their cycle of treatment on the rotatable circular support which begins when the tube is grasped and sealed and starts to rotate on the order of 200 R. P. M., as used in this embodiment. First a blast of steam is admitted blowing out any accumulated water and evacuating most of the air. The passage of the steam under pressure through the tube is continued for a determined length of time sterilizing the contents of the cans by throttling down the inlet steam valve 88, then water is immediately admitted cooling the contents of the cans. This is accomplished by the closure of the steam valve 123 and the opening of the inlet water valve 89, the vent valve 124 then functions as previously described. By this time the rotatable circular support 2 has come to the near end of one revolution, and the tube 5 is engaged by the unloading star wheels 165, whereupon they are moved over and guided by the guides 175' and 176 and engaged by the unloading star wheel 163 still being guided by the guides 175' and 176. They are next moved to the unloading station, whereupon as previously described the plunger 173 acting simultaneously with the plunger 172 pushes the cans out of the tube into a chute 176' whence they are delivered to a conveyer or other delivery means. This is clearly shown in Figs. 4, 6 and 14. After the tube has been unloaded the star wheel 163 at its next movement brings the tube up to the loading station opposite the support 177, whereupon as previously described the plunger 172 again pushes twenty-four cans into the tube and it continues through its cycle. The present embodiment of the invention is so arranged that a tube, i. e., twenty-four cans can be completely processed every nine seconds. Thus, high productivity of a martinetically controlled continuous process is accomplished by this invention.

The manner in which the embodiment of the invention is controlled is comprehended by reference to Fig. 14. It will be observed that there are two conveyers shown in this drawing. One, conveyer 175 to the reel 150 and another, belt conveyer 178 which is arranged to run less than half as fast as the conveyer 175 to the reel 150. These two conveyers are separated by a small platform 179 over which the clamping device is positioned.

Initially the clamping device 176 is open and the cans pass over the platform 179 onto the fast moving conveyer belt 175, whereupon they are brought up against the closed face of the gate 180. By reason of the wide spacing of the cans on the belt the switch 181 remains closed on its lower circuit 182. This causes the solenoid 183 to become energized, which in turn operates the valve 184 permitting oil to force the piston of the clamp 176 down, keeping it open and permitting cans to pass through.

The passage of twenty-four cans onto the belt 175 actuates the switch 181, for the last two cans closes the switch on its upper circuit 185. This also opens the lower circuit 182 of switch 181 which causes the solenoid 183 to become deenergized, thus the valve 184 permits oil to force the piston upward which effects the clamping of a can over the platform 179, this of course stops the flow of cans. The solenoid 186 is energized after the switch 187 is closed on its lower circuit 188 by reason of the action of lever 189 during the right hand i. e., loading stroke of the piston 166, thereupon the solenoid 186 operates the valve 190 which permits oil to enter the cylinder of the gate mechanism 191 which forces the piston downward and thus the gate 180 is opened. Hence, the cans are passed into the reel 150 by the conveyer 175.

The cans being in the reel are pushed back onto the support 177 by the action of the Geneva drive and previously described gear and chain linkage. The Geneva drive shaft 148 then operates the valve 192 to forward position by reason of a cam affixed thereto, which action allows the oil in the bore of the piston cylinder 166 to flow to the drain. On the rod side of the piston the oil is continuously admitted, this then forces the piston back, i. e., to the right, the oil on the left side of the piston which is of larger area is returned to the reservoir through the valve 192. The cans are pushed into the tube 5 by means of the plunger 172 and the rack and gear linkage. When the piston approaches the end of its loading stroke the cam 193 acts on the pilot valve 194 connecting the pump pressure line with the line to the lower end of the stem of valve 192 causing the valve stem to shift to the return position. The pilot valve 194 is held in return position by a detent to maintain pressure; this enables the oil pressure to hold the stem of valve 192 in return position against its centralizing spring. The piston at the end of the return stroke (i. e., left hand) shifts the pilot valve 194 to its original position allowing oil to flow from the valve stem through the pilot valve 194 and through the drain line, by action of the centralizing spring in the valve 192 which shifts the valve to center, or neutral position; when the valve is in neutral position the oil circulates through the open center construction back to the reservoir at slight pressure. The spring in the valve 192 further centralizes the stem so that oil may be circulated in the hydraulic system by reason of the open center construction of the same. When oil is directed to the piston 166 against its larger face the piston is forced forward or to the left due to the differential of area of the two piston surfaces.

As the piston 166 moves forward, i. e., to the left the switch 187 is held closed in its lower circuit 188 by the cam 193' until the end of the piston stroke when the spring centralized lever 195 acts on the switch 187 closing the upper circuit of switch 187 which is further, a positioner switch; the solenoid 183 which permits the valve 184 to operate the clamping means 176 which is energized because of the closed position of the switch 181 (i. e., the lower circuit 182 being closed) for the lower circuit is closed by reason of the fact that the cans which are moving past on the conveyor 175 do not keep the circuit open so as to permit the clamping means 176 to function.

The right hand stroke, i. e., backward, or loading stroke of the piston 166 closes the lower circuit of the switch 187. This closes the circuit to the solenoid 186 when the switch 181 is closed on its upper circuit 185, and it is in this closed position when two cans are at rest below it due to the fact that twenty-four cans have built up on the conveyer 175, because the first can of the row is stopped by the gate 180. The solenoid 183 is simultaneously deenergized causing oil to operate the piston which operates the clamping means 176, the flow of cans to the conveyer 175 is again stopped.

The solenoid 186 is then energized due to the closure of the lower circuit of switch 187 and the closure of the upper circuit of switch 181; oil is permitted to flow against the gate piston which opens the gate 180. Thereupon the cans pass into the reel 150 and are held there. The relay 196 holds the circuit closed so that the gate 180 will remain open when the cans pass from under the switch 181 which would otherwise open the circuit. The solenoid 183 remains de-energized by reason of the switch 187 being open on its upper circuit.

The reel 150 next pushes the cans back onto the support 177 by reason of the chain and gear linkage to the Geneva drive, whereupon the plunger 172 forces them into the tube 5 by reason of the backward, i. e., right hand movement of the piston 166 which is controlled by the Geneva drive operated valve 192. This movement also closes the lower circuit of the switch 187 and opens the upper circuit of the same switch.

Thus the gate 180 is closed and the clamp 176 is opened after the row of twenty-four cans which have been described are pushed into the tube 5 and the cycle is thereby repeated.

Hydraulic energy for the piston and cylinder 166 is provided by the gear pump 197 which is connected to an oil supply; energy for the clamping means 176 and the gate 180 is provided by the pump 198 which is also connected to the oil supply.

The safety device and general electrical connections of the present embodiment of the invention are illustrated in Fig. 15; where a single steam valve 200 for the entire machine is shown as controlled by a solenoid 199, the water valve 201 for the machine is likewise controlled by a solenoid 202. These are energized by electric current from the control 203 which is controlled by a starter switch 204. Thus, when the motor 25 for the hydraulic clamping device is started the steam and water valves are opened by means of the aforesaid solenoid and conversely when the hydraulic motor is shut off the steam and water valves are likewise shut off.

The hydraulic drive motor 197 for the loading and control mechanism is controlled by a switch 205 and started by the starter 206. It will be noted that it is impossible to start the hydraulic drive motor 197 which energizes the loading system, until the hydraulic drive motor 25 which energizes the hydraulic system in the heads 3 is started.

The Geneva drive and rotatable circular support motor 149 is controlled by the switch 208 and started by the starter switch 208'. Here also, the Geneva and rotatable circular support drive motor cannot be started until the loading hydraulic motor 197 is started. A spring operated friction brake 209 encircles the shaft 148' which is connected to the motor shaft. (Refer to Figs. 1 and 15.) This brake is released by a solenoid which is controlled by a pressure switch 210; which switch is connected to the hydraulic pump 34 for actuating the inlet heads, and which also controls the starting switch 208 to the Geneva drive and rotatable circular support motor 149. Thus, if the loading apparatus should cease to function pressure builds up in the hydraulic system opening the switch 210; hence, the solenoid on the brake 209 is released and the Geneva drive is stopped, as is the Geneva drive motor 149. The previously mentioned circuit is further controlled by a limit switch 212 which is placed so as to ride on the tubes 5 at the point just beyond where they are taken off the rotatable circular support by the star wheels at 211. See Fig. 5. If for any reason the tube remains in the heads 3 and 4 the circuit is opened, and the before mentioned safety device effectively stops the machine.

A pump motor 213 to drive the water pump which furnishes water to the heads under pressure is controlled by the switch 214 and started by the switch 215. The motor 216 to drive the conveyers 175 and 178 is controlled by the switch 217 and started by the starter switch 218.

The means and cycle of treatment whereby milk or feed products are sterilized and cooled in this present preferred embodiment of the invention consists of four steps, and can be appreciated by reference to Figs. 16, 17 and 18. First the cans which may be preheated are loaded in the tubes; this is accomplished by feeding previously spaced cans, i. e., preheated cans, by means of the conveyers 175 and 178 and by other means previously described into the reel 150; whence they are inserted into the tube 5. The tube 5 is directed by mechanical means to the rotatable circular support 2, whereupon the tube is grasped, sealed, and commences to rotate at the order of 200 R. P. M.

During the rotation of the tube the initial step is, a blast of super atmospheric steam at a high velocity, and this is passed through the tube for about two seconds, whereby any accumulated water and air is evacuated from said tube. Then steam at a high temperature (275° F.) and super atmospheric pressure is passed through the tube for a short, but nevertheless determined length of time of the order of 30 to 90 seconds. During this time the pressure may be built up to a point on the order of 35 p. s. i. gauge to provide maximum heat transfer. The tube 5 meanwhile is rotating about its longitudinal axis, as is the rotatable circular support 2 by which means the cams 41, 42, 43, 45 and 46 act upon the valves 72, 88, 89, 123 and 124 which control the passage of steam and water through said tube. Water is next admitted immediately after the steam cycle under pressures in the supply line of the order of a 25 p. s. i. to 90 p. s. i. range for a determined length of time cooling the cans and their food contents. The pressure of the cooling water is somewhat relieved so as not to crush the cooled cans and the tube meanwhile continues to rotate. At this point the tube is taken off the rotatable circular support on which it has passed through nearly one complete revolution thereof; this is accomplished by mechanical means. At the next step the cans are expelled from the tube by further mechanical means and the tube is next passed onto the loading station whereupon the cycle is repeated. Every nine seconds or less a cycle is completed. Thus processed cans may flow at a rate of one every ⅜ of a second.

The correct sterilization of milk is an undertaking fraught with hazards. It is thought that milk must be brought just to the graining point, i. e., the point where the protein constituents of the milk coagulate; this is the point of greatest viscosity of the milk. Since viscosity greatly retards fat separation in the milk it is immediately apparent that the graining point must be nearly reached. Canned milk which is kept in storage over periods upwards to a year tends toward fat separation. Also in bringing the milk to the graining point it is necessary to preclude any scorching or cooking. This is accomplished by a very rapid heat transfer and in order to have every can of milk uniform in quality and physical characteristics it was found best to place preheated cans in a tube containing locating and tractive means which form arcuate passages for the heating and cooling medium.

Fig. 19 represents a flow diagram which further utilizes the teachings within the scope of this invention. As is conventional the cans are filled in the filling machine with cooled evaporated milk. The cans are then sealed and passed on to a machine generally known as a "Thermo-Roto," manufactured by Chain Belt Company, where they are preheated. Besides conditioning the milk as in the instant embodiment for further treatment; this treatment further serves to thermally space the cans in the tube 5 of the sterilizing apparatus. For, as the contents of the cans are heated said cans bulge uniformly; when the cans are placed end to end in the tube 5 each has substantially the same surface to contact the heating or cooling medium.

The preheated cans are next directed to the sterilizing apparatus where they are inserted into the tube 5. The tube is first sealed and then rotated by the means shown. Simultaneous with the initial revolutions of the said tube a blast of steam is passed through the tube; as the steam enters the arcuate passages formed by the locating and tractive means, its velocity is increased due to the reduced cross-sectional area. The increase of velocity of the steam expels and further evacuates most of the air in the tube, and as the cans are "thermally spaced," each can has identically the same surface to heat and cool in a constant medium. The passage of the steam at slight velocity through the tube free of air and water help to break any film of condensate on the cans which would retard the transfer of heat. Thus the contents of the can can be flash sterilized, for the combination of a constant atmosphere with the thermal spacing and the rotation of the entire tube is made possible in the minimum of time. After the blast of steam the steam valve is slowly throttled down. It will be seen that a constant atmosphere of steam is present in the tubes.

Immediately after the contents of the can are sterile, water under pressure is passed through the revolving tube. This serves to quickly condense any steam and to build up pressure around the cans so that they will not burst. Because of the spacing, flow of water, and rotation of the tube, the cans and their contents are quickly cooled thereby reducing the internal pressure within them. After the cans are cooled the pressure of the coolant is relieved so that the cans will not be crushed. The process and methods of sterilization made possible by this invention produces a genuinely superior sterile milk which has no taste defects whatsoever, and which has physical characteristics that enable a long period of storage without any change in the quality of the milk.

The invention is not limited to the apparatus which has been chosen as its preferred embodiment, or to the methods for treating any particular food product, as it can be facilely applied to the treatment of divers comestibles, but many features apparent to those skilled in the art will become apparent in the reading of the foregoing description.

The invention having been described, what is claimed is:

1. Sterilizing apparatus for canned comestibles comprising a substantially horizontal sealable vessel, means communicating with the ends of said vessel to transmit heating and cooling media longitudinally through the vessel, rotatable supporting means for rotating said vessel, tractive means within said vessel disposed to centrally retain the cylindrical surfaces of cans of comestibles in near-relationship to the internal surface of said vessel, closing means cooperating with said rotatable supporting means whereby the vessel is sealed, and means engageable by said closing means for rotating said vessel.

2. An apparatus for sterilizing comestibles in sealed cans comprising a rotatable, tubular pressure chamber, tractive locating means disposed on the internal surface of said chamber to centrally retain cans arranged endwise and in near-relationship to the internal surface of said chamber thereby forming arcuate passages with the peripheries of cans when the latter are inserted in said chamber, closing means to seal the chamber, rotative means cooperating with said closing means whereby the chamber is rotated, said closing means having a passageway permitting the flow of heat transfer media, deflection means in said passageway causing said media to course toward the arcuate passages, valve admission means arranged to permit the flow of heat transfer media into said chamber, and exhaust means cooperable with said admission means whereby the longitudinal flux of said media may be regulated.

3. Apparatus according to claim 2 in which the closing means further comprises an inlet head positioned at one end of the chamber, an exhaust head positioned at the other end of the chamber, and a movable member in said inlet head arranged to seal the chamber by engaging said heads with the tube.

4. Apparatus according to claim 2 in which the closing means comprises an inlet head and an exhaust head, and the rotative means comprises a driving member arranged in one of the heads, a clutch associated with the driving member disposed in said head, means associated with each head movable axially thereof and arranged to engage the pressure chamber, and means in the other of said heads to cause engagement of the chamber by the engagement means and to engage the clutch to cause rotation of the chamber.

5. An apparatus for sterilizing comestibles in cans comprising a plurality of rotatable tubes, a movable support for said tubes, means to serially load said tubes with cans, means to rotate said tubes about their longitudinal axes, means to seal said tubes, controllable means to serially cause the longitudinal passage of heat exchange media through said tubes, and means to eject the cans from the tubes in series.

6. Apparatus according to claim 5 in which the controllable means further comprises adjustable cam operated valves arranged to cause a heating medium to pass through said tubes at a velocity to remove air and condensate therein, cams cooperating with said valves arranged to subsequently reduce the velocity of passage of the heating medium and to build up the pressure of said medium in the tubes sufficient to cause rapid heating of the comestible during their rotation, other adjustable cam operated valves arranged to permit the passage of a cooling medium through the tubes at a pressure substantially equal to the pressure developed within the cans by the action of the heating medium, and means to reduce the pressure of said cooling medium at a rate commensurate with the reduction of pressure within the cans consequent to cooling of the comestible.

7. An apparatus for treating comestibles in cans comprising a plurality of rotatable tubes, a rotatable support for said tubes, mounting means on said support for said tubes, means to load said tubes with cans, means to place said loaded tubes on said support in series, actuating mean to mount said tubes on the support in series, means to rotate said mounted tubes about their longitudinal axes, means to pass heat exchange media through said mounted tubes, means to demount said tubes in series, further means to remove the tubes from said support, and means to expel the treated cans contained in said tubes.

8. Apparatus according to claim 7 in which the expelling means operates simultaneously with the loading means.

9. In a combined pressure cooker and cooling machine for evaporated milk, a rotatable chamber, tractive locating rods within said chamber arranged to form longitudinal arcuate passages with the peripheries of cans inserted therein, rotating means for said chamber, means arranged to engage said rotating means whereby the chamber is rotated, said actuating means being further arranged to seal said chamber, and adjustable flux control means whereby the passage of heat transfer media through said passages is regulated.

10. In a combined pressure cooker and cooling machine for canned comestibles, a rotatable tubular chamber, tractive locating rods within said chamber arranged to form longitudinal arcuate passages with the peripheries of cans inserted therein, rotating means for said chamber, means arranged to engage the chamber and said rotating means after the chamber is filled with cans, seals on said chamber and said means engageable by said actuating means, and adjustable flux control means whereby the passage of heat transfer media through said passages is controlled.

11. An apparatus for processing canned comestibles including a movable support divided into a plurality of stations, tubular chambers for said stations, said chambers having tractive locating means arranged within so as to form substantially uniform passages with the peripheries of cans containing comestibles inserted therein, means for inserting a plurality of cans into each of said chambers, means to successively convey said loaded chambers to their stations on said support, means to seal and rotate said chambers, valve means to meanwhile pass a heating media through said chambers, further valve means arranged to subsequently pass a cooling media through said chambers, means to successively remove said chambers from their stations on the support, and means to remove the cans from each of said chambers.

12. An apparatus for processing canned comestibles including a rotatable circular support divided into a plurality of stations, rotatable tubes for said stations, rod-like supports in said tubes arranged to centrally support cans inserted therein and forming longitudinal passages over the peripheries of said cans, means to fill said tubes with cans, means to successively convey said filled tubes to said rotating circular support at their respective stations, means to seal said tubes at their stations to cause contact with rotating means on said support whereby the tubes and cans are rapidly rotated about their longitudinal axes, means to pass a heating media into said tubes, means arranged to subsequently pass a cooling media into said tubes, means to release said tubes from their stations, and means to remove the processed cans from said tubes.

13. An apparatus for processing canned food products including a plurality of tubes to contain sealed cans of food products, spaced rod-like parallel members extending longitudinal of said tubes affixed to the internal surfaces of said tubes arranged to form small arcuate passages with the peripheries of cans inserted in said tubes, a continuously rotatable support divided into a plurality of stations for receiving said tubes, means to successively fill said tubes with cans in lengthwise relationship, means to successively convey said filled tubes to said stations on the rotating support, sealing means for said tubes, rotating means for the tubes at said stations, fluid actuated means at said stations arranged to seal said tubes while engaging said rotating means whereby the tubes are rapidly rotated about their longitudinal axes, means to next pass heating media through said rotating means arranged so that the area of the admission means is substantially the same as the total area of said arcuate passages, means to subsequently pass cooling media through said tubes, means to subsequently successively remove said tubes from said support, and means to remove the processed cans from the tubes.

HORACE L. SMITH, Jr.

REFERENCES CITED

The following references are of record in the file of this patent:

UNITED STATES PATENTS

| Number | Name | Date |
| --- | --- | --- |
| 2,056,526 | Kennedy | Oct. 6, 1936 |
| 2,062,331 | Page et al. | Dec. 1, 1936 |
| 2,119,346 | Page et al. | May 31, 1938 |
| 2,144,334 | Kennedy | Jan. 17, 1939 |
| 2,264,846 | Huebsch | Dec. 2, 1941 |
| 2,322,693 | Kennedy | June 22, 1943 |
| 2,372,239 | Whitaker et al. | Mar. 27, 1945 |
| 2,388,103 | Whitaker et al. | Oct. 30, 1945 |